No. 870,694.　　　　　　　　　　　　　PATENTED NOV. 12, 1907.
J. S. SMITH.
FEED RACK.
APPLICATION FILED DEC. 29, 1906.
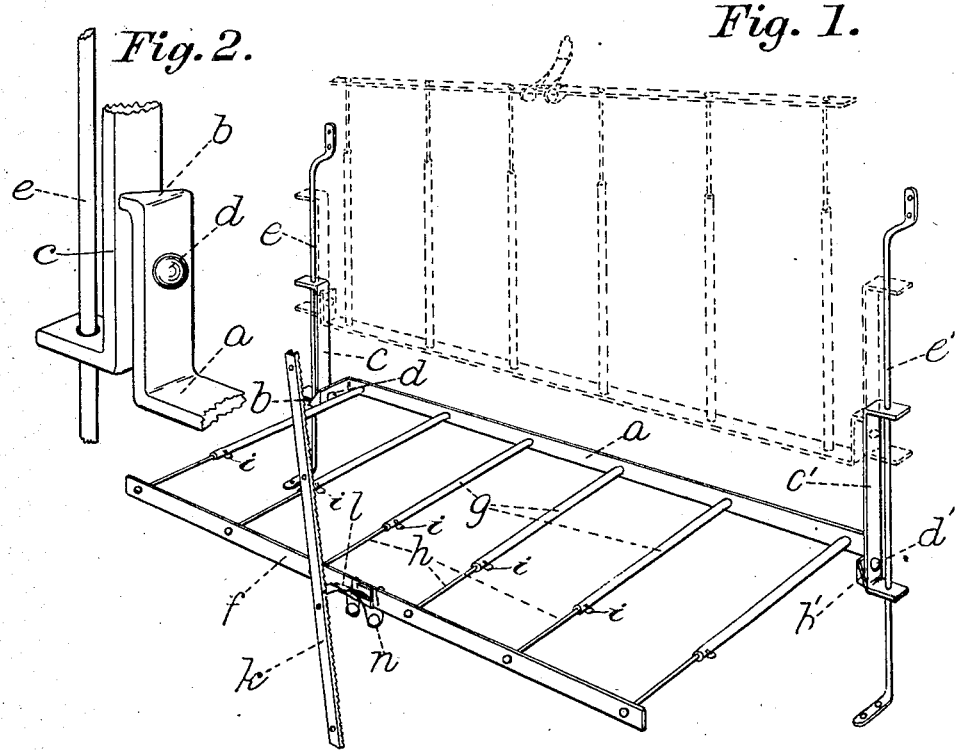
WITNESSES:
James Stanley Smith INVENTOR
BY G. J. Bowman
ATTORNEY
THE NORRIS PETERS CO., WASHINGTON, D. C.

UNITED STATES PATENT OFFICE.

JAMES STANLEY SMITH, OF SPOKANE, WASHINGTON.

FEED-RACK.

No. 870,694.  Specification of Letters Patent.  Patented Nov. 12, 1907.

Application filed December 29, 1906. Serial No. 350,040.

*To all whom it may concern:*

Be it known that I, JAMES STANLEY SMITH, a citizen of the United States, residing at Spokane, in the county of Spokane and State of Washington, have invented a new and useful Feed-Rack, of which the following is a specification.

My invention relates to improvements in feed troughs in which a selfadjustable guard frame maintaining a position over and in contact with the fodder as it is consumed is suspended within the trough, and the object of my improvement is to provide a simple and effective means to prevent the waste of fodder by stock when feeding. I attain this object by the mechanism illustrated in the accompanying drawing, in which—

Figure 1 is a view of the device as it appears mounted in the trough; Fig. 2 is a view showing beveled end of frame $b$ in operative relation to piece sliding on rod $e$; Fig. 3 is a detail view of tongue attached to frame engaging ratchet bar $k$; and Fig. 4 is a detail view of ratchet bar.

Similar letters refer to similar parts throughout the several views.

The guard frame (Fig. 1) consists of side bars $a$ and $f$ connected by transverse bars, viz: tubes $g$ mounted on side bar $a$, and rods $h$ mounted on side bar $f$, the tubes $g$ and rods $h$ being adjustable the one to the other and secured in position by set screws $i$. The ends of the side bar $a$ are extended and bent at right angles toward the body of the frame and again bent at right angles outwardly from the frame and terminate in beveled ends $b$ and $b'$. The side bar $a$ is pivoted at $d$ and $d'$ to sliding pieces $c$ and $c'$ mounted on rods $e$ and $e'$, which are attached preferably to the rear of the trough or manger. The tongue $l$ (Fig. 3) is attached by a hinge joint to side bar $f$ and is supported and held in position by spring $n$ and cross piece $o$. The free end of tongue $l$ is notched to form shoulders $m$, which engage notches on ratchet bar $k$ (Fig. 4), which ratchet bar is made in the form of a channel bar notched on both edges, and is preferably attached to the front of the trough or manger. The spring $n$ holds the tongue $l$ in operative relation to ratchet bar $k$, the shoulders $m$ engaging the two rows of notches or teeth and the extreme end of the tongue $l$ engaging the channel or groove in ratchet bar $k$ formed thereby. Instead of being attached as shown in Fig. 1, the ends of rods $e$ and $e'$ may simply be inserted in holes in the bottom of the manger. Other forms of ratchet bar may be used possibly with equal advantage; for instance, a single row of teeth with grooved tongue engaging same on each side.

The method of operation and manner of using the feed rack is as follows: the tongue $l$ is disengaged from ratchet bar $k$ and the front of frame raised slightly and the frame then raised by sliding on rods $e$ and $e'$ to top of rods, and then the frame is swung on pivots $d$ and $d'$ upward and backward into position shown by dotted lines (Fig. 1). As the frame is being swung upward and backward, the beveled ends $b$ and $b'$ of side bar $a$ engage sliding pieces $c$ and $c'$, pressing them apart and causing them to bind on rods $e$ and $e'$, thereby holding the frame in any position on rods $e$ and $e'$. The frame being raised to top of rods and thrown back, the trough may then be filled with hay, straw or other fodder and the frame thrown down into a horizontal position, thereby releasing the sliding pieces $c$ and $c'$ on rods $e$ and $e'$, permitting the frame to slide down on top of the fodder, and the tongue $l$ at the same time engages the ratchet bar $k$ and holds the frame in position and prevents the front of the frame from being raised by the animal feeding. The sliding pieces $c$ and $c'$ also operate to prevent the back of the frame from being raised by the pulling out of the fodder, in this manner; the sliding pieces $c$ and $c'$ are made of a sufficient length so that when force is exerted to raise the frame, a prying force is exerted by the sliding piece on the rod farthest from the upward force, causing it to bind on the rod and prevent the frame from being raised. By these means, as the fodder is consumed and the frame settles down of its own weight or is pushed down by the animal feeding, it is prevented from being raised, and is held firmly in position on top of the fodder. The guard frame being made in two sections, it can be adjusted to width of manger.

Having thus fully described my invention, I claim and desire to secure by Letters Patent—

1. In combination with a feed trough, a feed rack within the trough, consisting of rods attached to one side of the trough, a guard frame slidably mounted thereon, and means for controlling the movement of the frame on the rods.

2. In combination with a feed trough, a feed rack within the trough, consisting of rods attached to one side of the trough, a ratchet bar with downwardly disposed teeth attached to the opposite side of the trough, and a guard frame slidably mounted at one side on the rods, the other side having a tongue engaging the ratchet bar.

3. In combination with a feed trough, a feed rack within the trough, consisting of two parallel rods attached to one side of the trough, a sliding piece mounted on each rod consisting of a bar having its ends bent at right angles to the bar, the said ends having holes engaging the rod, and a guard frame pivoted on one side at each end to the sliding pieces.

4. In combination with a feed trough, a feed rack within the trough, consisting of two parallel rods attached to one side of the trough, a sliding piece mounted on each rod consisting of a bar having its ends bent at right angles to the bar, the said ends having holes engaging the rod; and a guard frame composed of side bars and transverse bars connecting the side bars, the ends of the side bar at one side of the guard frame being extended and bent at right angles toward the other side bar, and again bent at right angles outwardly from the guard frame and beveled, the said side bar being pivoted at each end between the angles thereof to the sliding pieces.

5. In combination with a feed trough, a feed rack within the trough, consisting of rods attached to one side of the trough, a channeled ratchet bar with downwardly disposed teeth attached to the opposite side of the trough, and a guard frame slidably mounted at one side on the rods, the other side having a hinged tongue and a spring attached to the frame engaging the tongue, the said tongue being held in engagement with the channeled ratchet bar by the spring and provided on each side with a shoulder near its end, the shoulders engaging the ratchets and the extremity of the tongue the channel.

6. In combination with a feed trough, a feed rack within the trough, consisting of rods attached to one side of the trough, a guard frame composed of telescoping sections slidably mounted thereon, and means for controlling the upward movement of the frame on the rods.

7. In combination with a feed trough, a feed rack within the trough, consisting of rods attached to one side of the trough, a ratchet bar with downwardly disposed teeth attached to the opposite side of the trough, and a guard frame composed of side bars and transverse bars connecting the side bars, the transverse bars being in two sections slidably mounted on each other, one side of the guard frame being slidably mounted on the rods, and the other side of the guard frame having a tongue engaging the ratchet bar.

8. In combination with a feed trough, a feed rack within the trough, consisting of two parallel rods attached to one side of the trough, a channeled ratchet bar with downwardly disposed teeth attached to the opposite side of the trough, a sliding piece mounted on each rod consisting of a bar having its ends bent at right angles to the bar, the said ends having holes engaging the rod; and a guard frame composed of side bars and transverse bars connecting the side bars, the transverse bars being in two sections slidably mounted on each other, one side of the guard frame being pivoted at each end to the sliding pieces, and the other side of the guard frame having a tongue engaging the ratchet bar.

9. In combination with a feed trough, a feed rack within the trough, consisting of two parallel rods attached to one side of the trough, a channeled ratchet bar with downwardly disposed teeth attached to the opposite side of the trough, a sliding piece mounted on each rod consisting of a bar having its ends bent at right angles to the bar, the said ends having holes engaging the rod, and a guard frame composed of side bars and transverse bars connecting the side bars, the transverse bars each consisting of a rod attached to one side of the guard frame sliding within a tube attached to the other side of the guard frame, and a set screw near the outer end of the tube engaging the rod, the ends of the side bar at one side of the guard frame being extended and bent at right angles toward the other side bar, and again bent at right angles outwardly from the guard frame and beveled, the said side bar being pivoted at each end between the angles thereof to the sliding pieces, and the other side of the guard frame having a hinged tongue and a spring attached to the frame engaging the tongue, the said tongue being held in engagement with the channeled ratchet bar by the spring and provided on each side with a shoulder near its end, the shoulders engaging the ratchets and the extremity of the tongue the channel.

In testimony whereof I have signed my name to this specification in the presence of two subscribing witnesses.

JAMES STANLEY SMITH.

Witnesses:
 A. H. GREGG,
 E. C. MEANS.